United States Patent [19]

Furukawa

[11] 4,168,426
[45] Sep. 18, 1979

[54] APPARATUS FOR NUMERICALLY CONTROLLING WORK PATTERNS IN AN ELECTRO-DISCHARGE MACHINE

[76] Inventor: Toshihiko Furukawa, 10-15, 4-chome, Tsukimino, Yamato-City, Kanagawa, Japan

[21] Appl. No.: 832,181

[22] Filed: Sep. 12, 1977

[51] Int. Cl.² .............................................. B23P 1/08
[52] U.S. Cl. .................................... 219/69 V; 318/569
[58] Field of Search ............... 219/69 V, 69 E, 69 G, 219/69 M, 69 R; 318/569, 574

[56] References Cited

U.S. PATENT DOCUMENTS

| 3,135,852 | 6/1964 | Bentley et al. | 219/69 V |
| 3,548,281 | 12/1970 | Anis | 318/569 |
| 3,564,190 | 2/1971 | Kandajan et al. | 219/69 V |

Primary Examiner—Bruce A. Reynolds
Attorney, Agent, or Firm—Trexler, Wolters, Bushnell & Fosse, Ltd.

[57] ABSTRACT

An attachment is disclosed cooperating with an electro-discharge machining apparatus having a main shaft which is movable in the vertical direction. The attachment is mounted between the lower end of said main shaft and an electrode for carrying out electro-discharging. The attachment provides a planar movement of the electrode, and controls the vertical movement of the main shaft so that the planar and vertical movements of the electrode are made alternately.

2 Claims, 8 Drawing Figures

and the device set forth in one embodiment of this invention; and

FIG. 8 shows waveforms that serve to be explanatory for FIG. 6.

APPARATUS FOR NUMERICALLY CONTROLLING WORK PATTERNS IN AN ELECTRO-DISCHARGE MACHINE

BACKGROUND OF THE INVENTION

This invention relates to a device used in an electro-discharge machining apparatus for moving the electrode according to a given program; more particularly, it relates to a device that can easily be attached to a commercial electro-discharge machining apparatus as an attachment.

A commercial electro-discharge machining apparatus is equipped with a main shaft which has an electro-discharging electrode on its lower end. This electrode is driven by the main shaft axially with respect to a workpiece.

If the drive feed rate of the electrode is increased to increase machining speed, the work surface facing the electrode becomes coarse. To lessen the coarseness of the work surface to a desired level, another machining is carried out with an electrode of a larger size, or the first electrode is moved relative to the workpiece in a direction substantially normal to its axis (or alternatively, the workpiece may be moved with the electrode being fixed). Conventionally, the former method is called "rough machining," and the latter "finish machining," and the process for moving the electrode transversely of and relative to the workpiece or the worktable in "finish machining" is called "approach machining."

In the prior art, approach machining is accomplished by the operator who empirically moves the workpiece-carrying work-table transversely of the electrode. Accordingly, the conventional approach machining largely depends upon the operator's dexterity, and is unfit for achieving high precision machining. Another defect of the conventional approach machining is that it is not efficient for providing complicated work patterns.

SUMMARY OF THE INVENTION

A primary object of this invention is to automatically accomplish the approach machining in electro-discharge machining.

Another object of this invention is to provide precise and efficient formation of a variety of work patterns according to a given program by lateral or planar movement of the electrode.

A further object of this invention is to construct a device that can achieve these objects as an attachment easily attachable to a commercial electro-discharge machining apparatus.

DESCRIPTION OF PREFERRED EMBODIMENTS

The conventional approach machining need to further described before discussing the electrode moving device of this invention.

Figure 1:
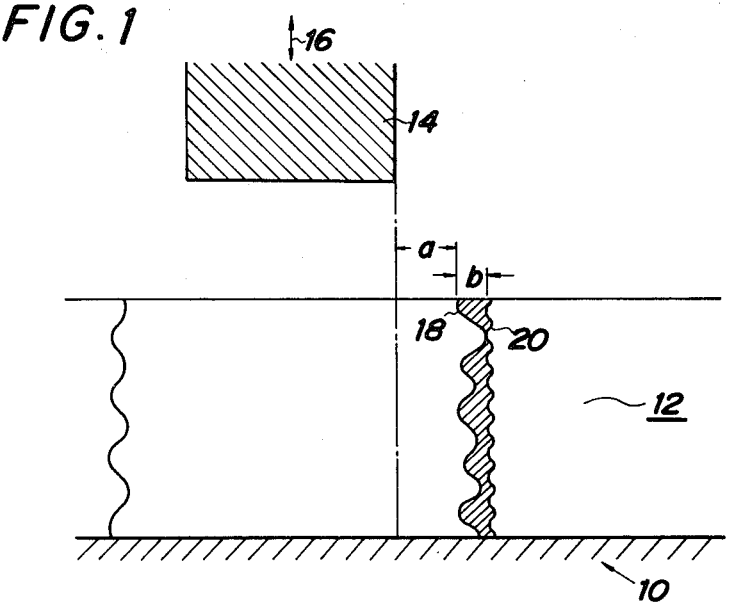
FIGS. 1 and 2 explain the approach machining in electro-discharge machining.

FIG. 1 explains the operation of boring a workpiece 12 placed on the table 10 of an electro-discharge machining apparatus with a regular square bar electrode 14 attached to the tip of the main shaft of the apparatus. The electrode 14 is capable of moving in a longitudinal direction 16. When it is assumed that the size of the cross section of the electrode 14 is 10×10 mm, and that the workpiece 12 is 50 mm thick, the volume of the workpiece to be machined is 5 cm$^3$. When the workpiece is made of iron whose specific gravity is 7.8, its total weight for machining is 39 g. If the machining rate is selected at 5 g/min, machining takes only 7.8 min, but as shown by the solid line 18, the work surface comes very coarse (about 100 μRmax). In FIG. 1, the dimension a represents the gap for electro-discharge machining. In order to lessen the coarseness of the work surface to about 10 μRmax which is desired for practical purposes, the machining rate must be reduced to 0.03 g/min, which in turn requires a machining time of 1,300 min.

Figure 2:
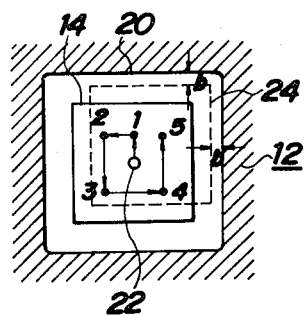

Therefore, according to the conventional technique, the total machining time is reduced by first subjecting the workpiece to rough machining with a fast moving electrode, and then, to provide a finished surface as indicated by the line 20, performing approach machining wherein the electrode is moved a distance of b on a plane at a right angle to the axial direction. Instead of such a planar movement of the electrode 14, the conventional approach machining method moves the table 10 in such a manner that the center point 22 of the electrode describes a path connecting the points 1, 2, 3, 4 and 5. When its center 22 is brought to the point 5 in FIG. 2, the electrode 14 is in the position indicated by the broken line 24.

As stated above, the formation of the finished work surface 20 by such approach machining according to the conventional technique depends upon the operator's moving the table 10 by hand, and so, said conventional method is not only inefficient but it is unable to provide a work surface with high precision.

Figure 3:
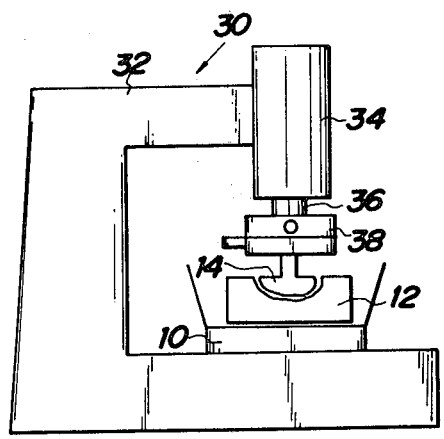
FIG. 3 shows the relationship between a commercial electro-discharge machining apparatus and the device according to this invention.

As shown in FIG. 3, according to this invention, a discharging electrode 14 is attached via an attachment 38 to the lower end of the main shaft 36 pendant from the head 34 cantilevered by the column of a commercial electro-discharge machining apparatus 30. The main shaft 36 is capable of moving the electrode 14 in an axial direction, and the attachment 38 accomplishes a planar movement of the electrode 14. A workpiece 12 is shown to be placed on the table 10 of the electro-discharge machining apparatus to be machined by the electrode 14.

Figure 4:
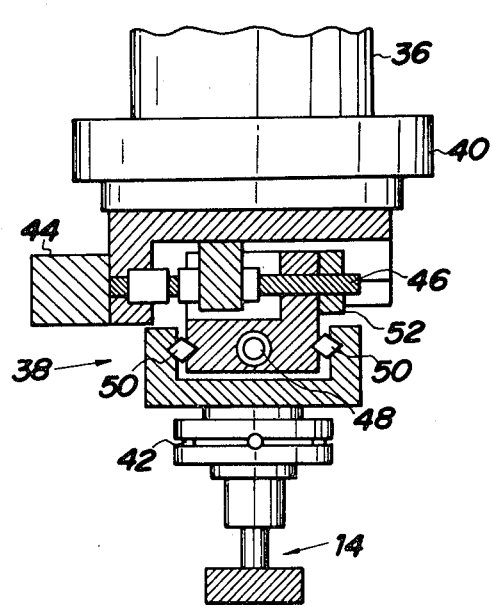
FIG. 4 is an enlarged cross section of part of FIG. 3.

FIG. 4 shows, more specifically, the structural relationship between the main shaft 36, the attachment 38 and the electrode 14 for carrying out electro-discharging. The attachment 38 is attached to the main shaft 36 via a face plate 40. The electrode 14 is attached to the attachment 38 via a universal chuck 42. The attachment 38 is capable of moving the electrode 14 in directions of X axis and Y axis by means of an X axis pulse motor 44 and a Y axis pulse motor (not shown) respectively. The X axis pulse motor turns an X axis driving screw 46, and the Y axis pulse motor, a Y axis driving screw 48. Means are provided for accomplishing a given planar movement of the electrode by selectively turning the two screws 46 and 48. It includes for example a Y axis roller guide 50 and a prepressurized nut 52.

The axial movement of the electrode 14 follows the movement of the main shaft 36. In other words, the electrode is driven by a main shaft servo motor which allows the main shaft to move vertically; that is to say, it is driven by the main shaft servo motor in the direction of Z axis. The electrode is also subjected to a planar movement, or to a movement on a plane at a right angle to Z axis. Such movement is effected by the X axis and Y axis pulse motors.

Figure 5:
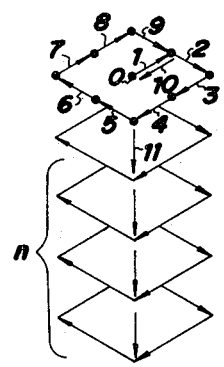
FIG. 5 shows an example of the path described by moving the electrode according to this invention.

FIG. 5 shows one example of paths described by the electrode during electro-discharge machining of the workpiece. Assume that the origin point 0 on a planar surface is the first position of the electrode 14. The arrow 1 represents the movement of the electrode in +X axis direction by one unit; the arrow 2 represents the movement of the same in −Y axis direction by one unit; the arrow 3 represents a one unit movement of the same in −X axis direction; the arrow 4 represents a one unit movement of the same in −X axis direction; arrow 5 represents a one unit movement in +Y axis direction; the arrow 6 represents a one unit movement in +Y axis direction; the arrow 7 represents a one unit movement in +X axis direction; the arrow 8 represents a one unit movement in +X axis direction; the arrow 9 represents a one unit movement in −Y axis direction; and the arrow 10 represents a one unit movement in −X axis direction. Such movement of the electrode is accomplished by selectively driving the X axis and Y axis pulse motors. The movement in the direction indicated by the arrow 10 brings the electrode back to the origin point 0. Then, the electrode is moved in a direction of Z axis indicated by the arrow 11 by means of the main shaft servo motor. The mode of movements described above is repeated by n times.

Figure 6:
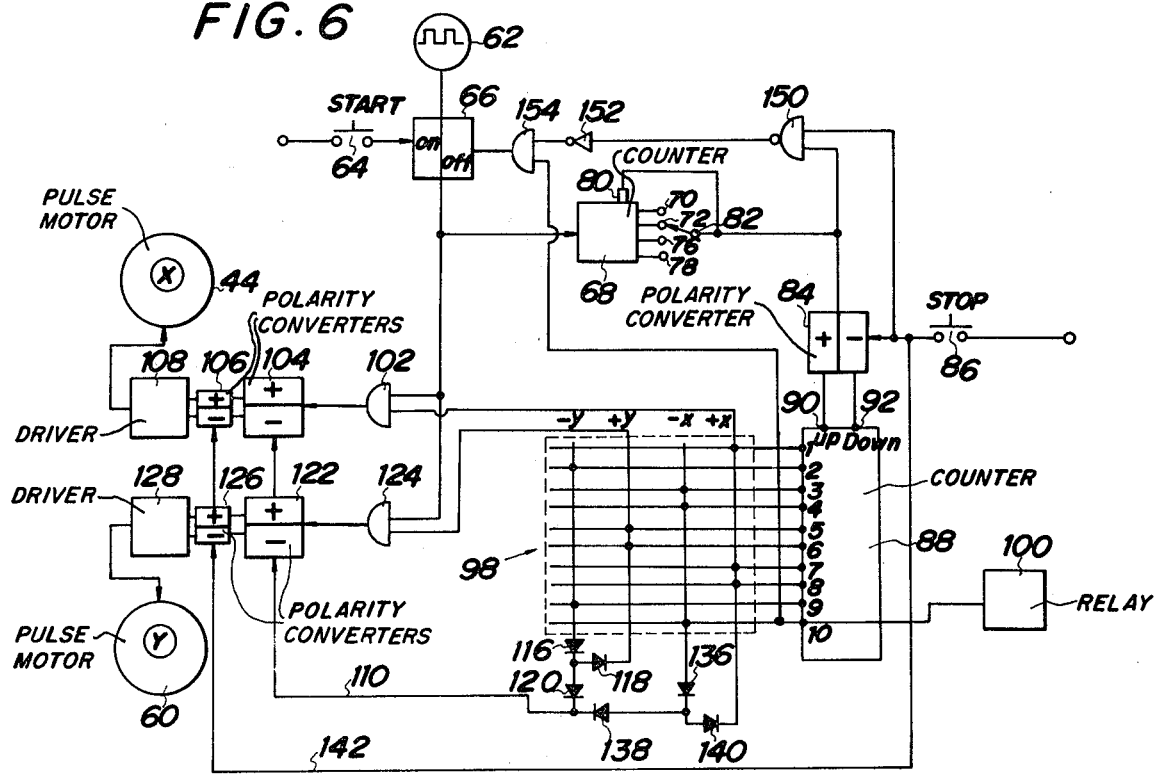
FIG. 6 is a block diagram of one embodiment of the device of this invention.
Figure 7:
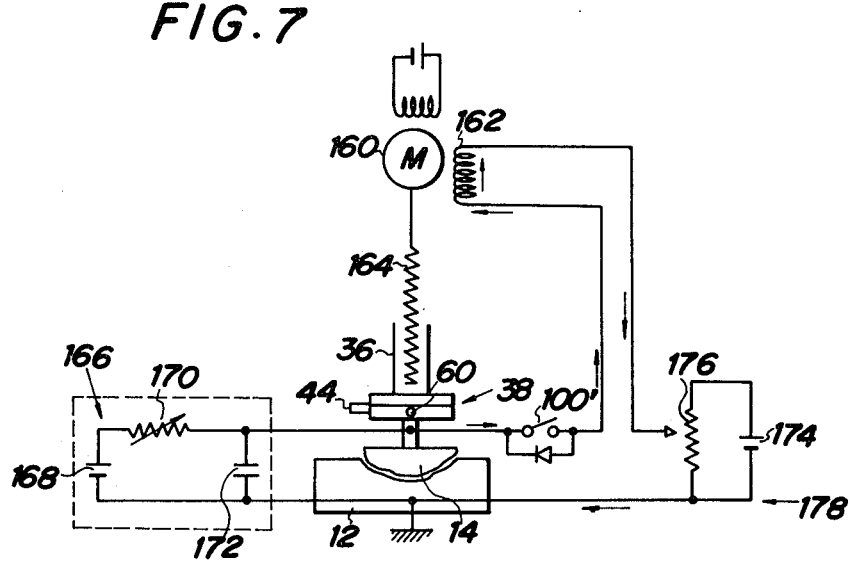
FIG. 7 shows the operational relation between the part of a typical commercial electro-discharge machining apparatus where the main shaft is vertically moved and the device set forth in one embodiment of this invention.

FIGS. 6 and 7 show an electric circuit for the attachment 38 and a main shaft servo motor control circuit respectively, preferred for providing the paths of the electrode described above.

FIG. 6 shows a circuit for controlling the X axis pulse motor 44 and the Y axis pulse motor 60. A clock-pulse oscillator 62 outputs clock pulses that provide a reference for driving of the pulse motors. Each pulse motor is such that it rotates fully once in response to 800 clock pulses. The X axis and Y axis driving screws coupled to the pulse motors 44 and 60, respectively, are precision quenched, having a pitch of 0.5 mm. Accordingly, the electrode moves 0.625 μm in response to one clock pulse.

Figure 8:
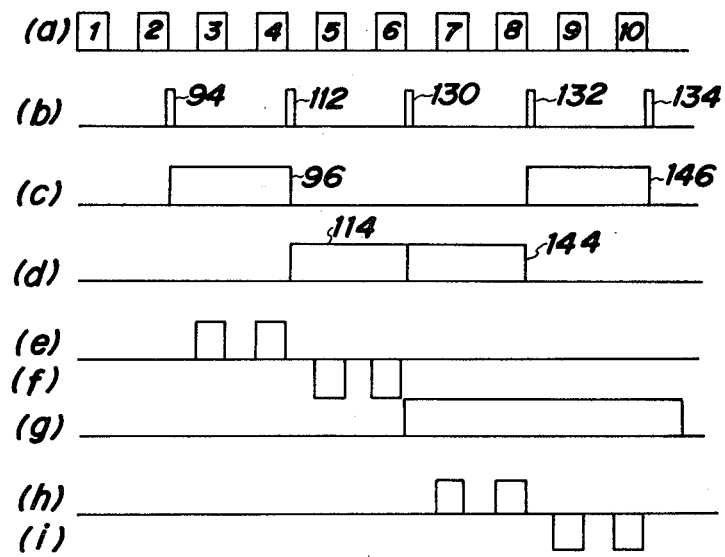
FIG. 8 shows waveforms that serve to be explanatory for FIG. 6.

The first position of the electrode is on the origin point 0 in FIG. 5. A start button 64 is pressed to actuate a switch 66, whereupon the clock pulses generated by the oscillator 64 are provided to the first counter 68. The counter 68 has a plurality of output terminals 70, 72, 76 and 78 and a reset terminal 80; the terminal 70 is capable of providing an output pulse responsive to each clock pulse, the terminal 72 is capable of providing an output pulse responsive to every other clock pulse, the terminal 76 is capable of providing an output pulse responsive to every third clock pulse, and the terminal 78 is capable of providing an output pulse responsive to every fourth clock pulse. The switch 82 is used to select any one of these counter outputs. An output pulse thus selected by the switch is provided to the reset terminal 80 of the counter 68. FIG. 8(a) shows a series of clock pulses, whereas FIG. 8(b) shows a counter output connected to the terminal 72. The counter output is provided to a polarity converter 84. The polarity converter 84 provides an inverted output when a stop switch 86 which will be discussed later is actuated. A non-inverted output from the polarity converter 84 is provided to a forward count input 90 of the second counter 88, and an inverted output is provided to a reverse count input 92 of the same.

Accordingly, the counter output pulse 94 generated from the switch 82 in response to the clock pulse 2 is provided to the output erminal 1 of the second counter 88 via the terminal 90 and is developed at said terminal 1 as a pulse 96 as shown in FIG. 8(c). The pulse 96 is provided to a switch matrix 98, for example, of pinboard type. A variety of switches, for example, push button switch, snap switch, and so forth, may be used for the matrix 98. Said matrix comprises a group of horizontal lines connected to the respective output terminals 1 to 10 of the counter 88 and a group of vertical lines +X, −Y, +Y and −Y. The cross points of these vertical and horizontal lines may be connected selectively. The matrix 98 shown is so constructed as to achieve the mode of operation specified in FIG. 5. A relay 100 is provided which is responsive to an output signal from the output terminal 10 of the counter 88.

The signal 96 at the output terminal 1 of the counter 88 is outputted from +X line in the matrix 98 and provided to one input of an AND gate 102. The other input of the AND gate is such that it receives clock pulses. An output of the AND gate is provided through polarity converters 104 and 106 to a driver 108 for driving the X axis pulse motor 44. The polarity converter 104 inverts the polarity of the output signal from the AND gate 102 when a signal exists on the line 110. The polarity converter 106 inverts the polarity of the signal when the stop switch 86 is connected to a voltage source (not shown) is manually or automatically closed during a given time. Therefore, the AND gate 102 actuated by the pulse 96 provides clock pulses 3 and 4 to the driver 108 via the polarity converters 104 and 106 without changing their polarity. The waveforms of the pulses inputted to the driver 108 are shown in FIG. 8(e). A next counter pulse 112 from the switch 82 is also provided to the forward input terminal 90 of the counter 88. As a result, a pulse 114 as shown in FIG. 8(d) is generated at the output terminal 2 of the counter 88. The pulse is transmitted to −y line and further provided to a polarity converter 122 via diodes 116 and 120 and a line 110 so as to obtain a polarity inverted state. On the other hand, it is provided to an AND gate 124 via a diode 118 and +y line. Accordingly, clock pulses 5 and 6 are generated at the output of the AND gate 124, and after their polarity is converted by the polarity converter 122, they pass through a polarity converter 126 to be provided to a driver 128 for driving the Y axis pulse motor 60. The waveforms of the pulses inputted to the driver 128 are shown in FIG. 8(f). The polarity inverter 126, like the polarity inverter 106, provides a polarity inverted state by turning the stop switch 86 on.

A third counter pulse 130, a fourth counter pulse 132 and a fifth counter pulse 134 from the switch 82 generate a pulse at output terminals 3, 4 and 5, respectively, of the counter 88. The pulse 130 drives the X axis pulse motor 44 so as to move the electrode 14 by 2 clock pulses (7 and 8) in the direction of −X axis, and the pulse 132 drives the same motor to move the electrode 14 by 2 clock pulses (9 and 10) in the same direction. The pulse 134 drives the Y axis pulse motor 60 so as to move the electrode 14 by 2 clock pulses in the direction of +Y axis. The output terminal 10 of the counter 88 is provided to diodes 136 and 138 to generate a signal in the line 110, and at the same time, it is provided to the +X line via a diode 140. It therefore drives the X axis pulse motor 44 in the direction of −X axis so as to turn the electrode 14 back to the origin point 0. At the same time, the output of the terminal 10 of the counter 88 is also provided to the relay 100 so that when the electrode 14 returns to the origin point 0 said output actuates the main shaft servo motor control circuit (shown in FIG. 7) for driving the electrode in the direction of Z axis.

As is clear from the above description, the 10 consecutive movements of the electrode 14 starting from and ending with the origin point 0 in FIG. 5 are achieved in response to the pulses outputted from the switch 82 coupled to the first counter 68. Upon returning to the origin point 0, the electrode is driven down the path 11 in the direction of Z axis by means of the relay 100. Finally, assume the case where the stop switch 86 is turned on when the electrode has finished moving in the directions 1 and 2 after its movement in Z axis direction.

Actuation of the stop switch generates a waveform shown in FIG. 8(g). Said waveform is provided through a line 142 to the polarity converters 106 and 126 to set them for an operational mode of polarity inversion. It also sets the polarity converter 84 for the same mode. Accordingly, a pulse corresponding to the third pulse 130 from the switch 82 is inputted to the reverse counter input 92 of the counter 88, where a signal pulse 144 is generated at the output terminal 2. Said pulse appears in the −y line and is provided to the line 110 via the diodes 116 and 120; it is also provided to the diode 118 to appear in the +y line and actuates the AND gate 124. Since the output of the AND gate is subjected to double inversion by means of the two polarity converters 122 and 126, waveforms as indicated in FIG. 8(h) appear at the input of the driver 128, and they drive the Y axis pulse motor to move the electrode in the +Y direction. In response to the next pulse corresponding to the pulse 134 in FIG. 8(b), the pulse 146 indicated in FIG. 8(c) appears at the output terminal 1 of the counter 88. Said pulse appears in the +x line so as to actuate the AND gate 102. The output of the AND gate is not inverted by the polarity converter 104 but it is inverted by the polarity converter 106; accordingly, the input of the driver 108 receives waveforms as indicated in FIG. 8(i), which in turn drive the X axis pulse motor so as to turn the electrode 14 back to the origin point 0.

The stop pulse indicated in FIG. 8(g) is also provided to one input of the AND gate 150. The pulses from the switch 82 is provided to the other input of the AND gate 150. The output of the AND gate 150 is inverted by an inverter 152 to be provided to one input of an AND gate 154. To the other input of the AND gate 154 is provided the output from the terminal 10 of the second counter 88. The output of the NAND gate 154 is provided to the switch 66 and used to inhibit the output of the clock-pulse oscillator. Consequently, the output NAND gate 154 turns the switch 66 off when the X axis pulse motor has brought the electrode 14 to the origin point 0.

The relay 100 shown in FIG. 6 operates so as to turn on the switch 100' of the main shaft servo motor control circuit shown in FIG. 7. A main shaft servo motor 160 is a DC motor the direction of the rotation of which is determined by the direction of the current flowing through a winding 162. The servo motor 160 is operatively associated with the main shaft 36 via a screw 164 coupled thereto. A voltage from a power supply 166 for the electro-discharge machine is applied across the electrode 14 and the workpiece 12, and said voltage determines a gap voltage for electro-discharge. The power supply 166 includes a DC power supply 168, a variable resistor 170, and a capacitor 172. A variably settable reference voltage supply 178 is provided which consists of a reference voltage source 174 from the power supply 178 and a potentiometer 176. The reference voltage is applied across the variable tap of the potentiometer and the ground. When the switch 100' is on and if the voltage across the electrode and the workpiece is higher than the reference voltage, the current flows in the direction indicated by the arrow to rotate the servo motor thereby moving the electrode in the direction of Z axis or that indicated by the arrow 11 in FIG. 5. The electrode continues moving in the direction of Z axis until the current ceases to flow through the motor winding 162 and the voltage across the electrode and the workpiece is balanced with the reference voltage. Upon detection of such balanced state, the stop switch shown in FIG. 6 is turned off. The embodiment set forth in FIG. 7 is just one example of the mechanism of moving the main shaft of a commercial electro-discharge machining apparatus. It goes without saying that this invention can be also applied to a mechanism of a hydraulic cylinder servo system. An essential requirement of this invention is that the timing to move the electrode in the direction of Z axis by the main shaft moving mechanism is detected, and that thereafter an X-Y axis moving mechanism as described in connection with FIG. 6 is started again.

According to this invention, the switch 82 associated with the output of the first counter 68 is capable of setting a one unit distance of movement of the electrode in the directions of X axis and Y axis, and the switch matrix 98 is capable of indicating the movement of the electrode either in the direction of X axis or in the direction of Y axis. Many different programs can be prepared according to given contents of machining. The device provided by this invention can be attached to a commercial electro-discharge machining apparatus without substantial modification of the apparatus. The planar movement and the vertical movement of the electrode are alternate and continuous. Therefore, chips can be smoothly removed from the apparatus during electro-discharge machining. In addition, if an opening bored by preliminary machining is off center, the device of this invention can provide a desired work opening pattern without any difficulty.

What is claimed is:

1. A numerical control apparatus for controlling work patterns in an electro-discharge machining apparatus having attached to the lower end of a main shaft an electrode that is moveable in an axial direction, said apparatus comprising: means for moving said electrode in the axial direction; means for moving said electrode in an X-axis direction; means for moving said electrode in a Y-axis direction; control means for controlling said X-axis direction moving means and said Y-axis direction moving means so that said electrode is moved from an origin within a plane containing two axes substantially normal to said axial direction in the X- or Y-axis direction at every unit distance and is returned to the origin along said axes whereby approach machining can be attained.

2. An apparatus in accordance with claim 1, which further comprises means for controlling said axial direction moving means so that said electrode is moved in the axial direction by a given distance after completion of the movement of the electrode within said plane.

* * * * *

UNITED STATES PATENT AND TRADEMARK OFFICE
CERTIFICATE OF CORRECTION

PATENT NO. : 4,168,426
DATED : September 18, 1979
INVENTOR(S) : TOSHIHIKO FURUKAWA It is certified that error appears in the above—identified patent and that said Letters Patent are hereby corrected as shown below:

Applicant claims priority under 35 U.S.C. §119 based upon Japanese application Serial No. 52-26237 filed March 9, 1977.

Signed and Sealed this

Twenty-ninth Day of January 1980

[SEAL]

Attest:

SIDNEY A. DIAMOND

Attesting Officer

Commissioner of Patents and Trademarks